United States Patent [19]
Spagnoli

[11] Patent Number: 5,441,229
[45] Date of Patent: Aug. 15, 1995

[54] HOLDER OF ASSEMBLAGE OF PILOT FLIGHT CHARTS

[76] Inventor: Remo Spagnoli, 6 Governor Dr., Newburgh, N.Y. 12550

[21] Appl. No.: 382,163

[22] Filed: Feb. 1, 1995

[51] Int. Cl.⁶ .................................. A47B 97/04
[52] U.S. Cl. ...................... 248/452; 108/44; 248/441.1; 248/442.2; 248/447.2
[58] Field of Search ........... 248/450, 445, 460, 441.1, 248/442.2, 447.2, 452, 451, 444; 108/44, 45

[56] References Cited
U.S. PATENT DOCUMENTS

| | | | |
|---|---|---|---|
| 1,013,784 | 1/1912 | Kugel | 248/452 |
| 1,249,015 | 12/1917 | Brink | 248/441.1 X |
| 1,818,253 | 8/1931 | Hermann | 248/441.1 |
| 2,542,290 | 2/1951 | Rochford | 248/452 |
| 2,862,328 | 12/1958 | Wadsworth | 248/452 X |
| 2,889,937 | 6/1959 | Best | 248/441.1 X |
| 4,842,235 | 6/1989 | Brown | 108/45 X |
| 4,969,623 | 11/1990 | Bernier | 248/442.2 |
| 4,995,637 | 2/1991 | Muraishi | 108/44 X |
| 4,998,704 | 3/1991 | Tarlow | 248/450 X |

Primary Examiner—J. Franklin Foss

[57] ABSTRACT

For an assemblage of plural flight charts of which a selected flight chart is typically of interest to a pilot as, for example, in executing a landing at an airport of which the layout thereof is displayed on the selected flight chart, a holder for supporting the assemblage from beneath having, in a preferred embodiment, a spring clip at an upper end releasing the assemblage otherwise engaged by the spring clip for page-turning but under the control of ring binder means interconnecting the bottom edge of the assemblage pages to a cooperating bottom end of the support, such that the page-turning is unimpeded while the pages thereof always remain attached to the support.

3 Claims, 1 Drawing Sheet

U.S. Patent          Aug. 15, 1995          5,441,229
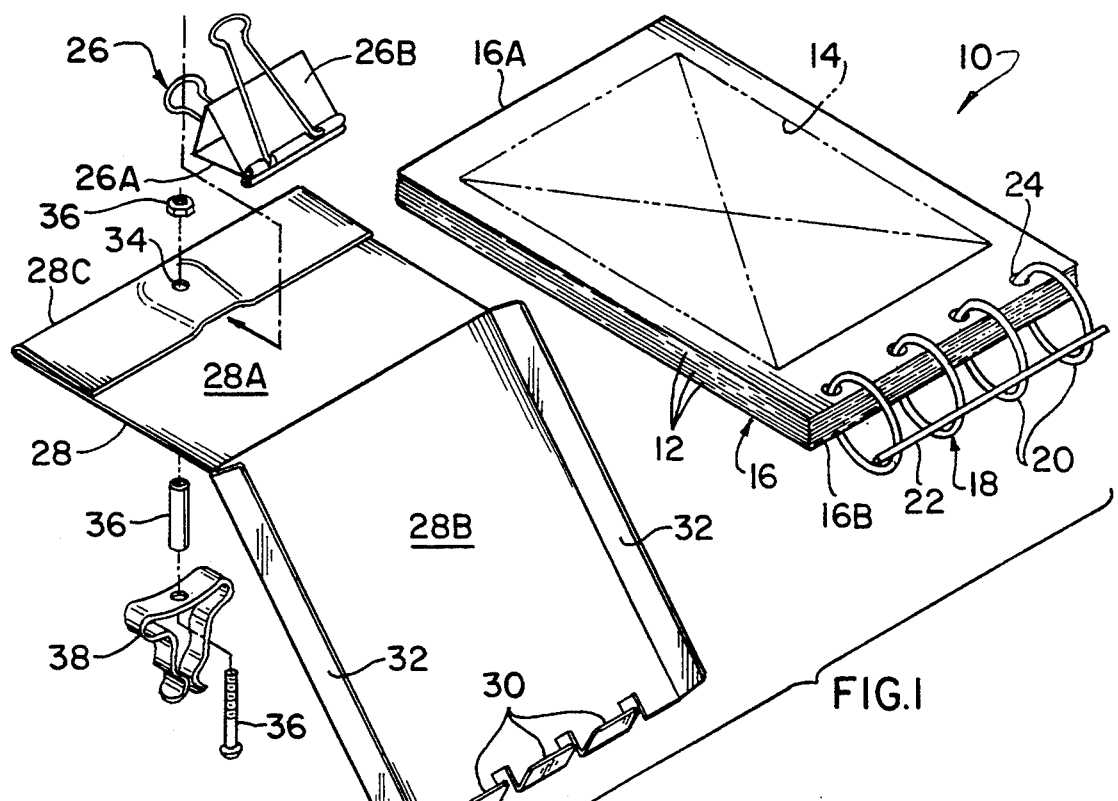
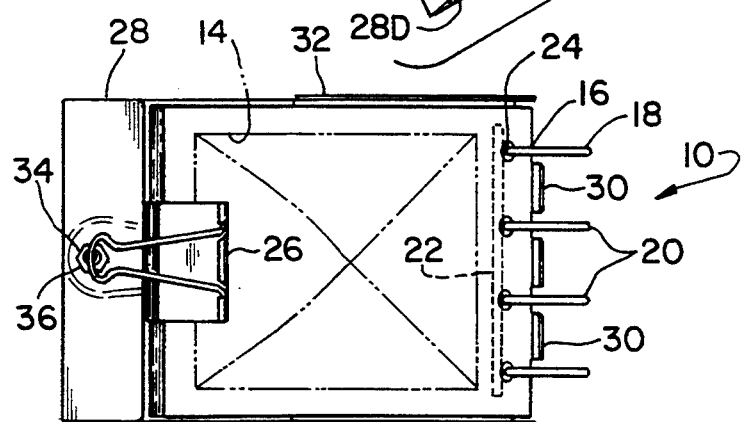
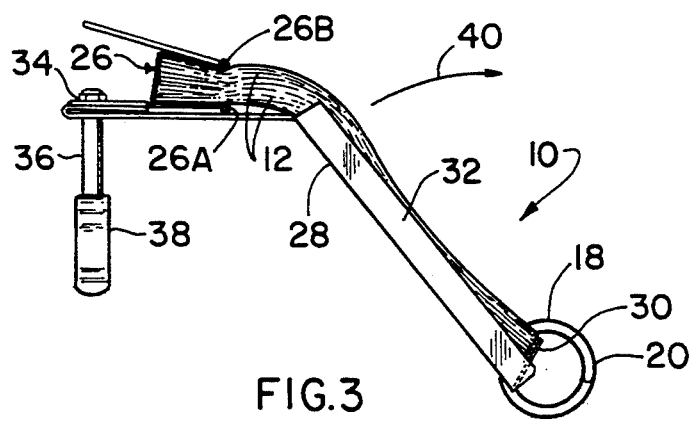

HOLDER OF ASSEMBLAGE OF PILOT FLIGHT CHARTS

The present invention relates generally to a holder for flight charts which display airport layouts, provide navigational information of flight plans and otherwise are of assistance to pilots, and more particularly to a holder which effectively handles for display an assemblage of numerous such flight charts, while facilitating the selection from the assemblage of a specific flight chart of interest.

EXAMPLE OF THE PRIOR ART

There is already in use and disclosed in the patented literature, as exemplified by U.S. Pat. No. Des. 317,788 to DeWitt issued on Jun. 25, 1991 for "Aviation Lap Board", variations of holders for documents, which specifically are flight charts or otherwise, in which the documents are held, typically along a top edge by a spring clip, providing a mode of use in which overlying documents are flipped over the spring clip until a selected document of interest is on display. While the spring clip prevents the numerous documents from falling into disarray, it impedes the page-turning that is necessary in locating a specific document of interest.

Broadly, it is an object of the present invention to provide a flight chart holder overcoming the foregoing and other shortcomings of the prior art.

More particularly, it is an object to embody a flight chart holder with a mode of use in which there is facilitated page-turning and the assemblage is nevertheless maintained with the documents thereof in a neat superposed arrangement, as well as providing other noteworthy benefits, all as will be explained in greater detail as the description proceeds.

The description of the invention which follows, together with the accompanying drawings should not be construed as limiting the invention to the example shown and described, because those skilled in the art to which this invention appertains will be able to devise other forms thereof within the ambit of the appended claims FIG. 1 is an exploded perspective view of the components, in disassembled relation, of a convenience article of manufacture for assisting an airplane pilot in navigation in accordance with the present invention;

FIG. 2 is a plan view of the assembled embodiment; and

FIG. 3 is a side elevational view thereof.

Shown and generally designated 10 in the drawings is an article of manufacture intended primarily for a pilot of a small airplane/aircraft to assist in landing, following a route, and otherwise providing information useful in navigation, although article 10 is not excluded by its construction and mode of use from also being used by national airlines in the operation of large commercial aircraft. As understood, flight charts are imprinted on rectangular paper substrate pages, herein individually designated 12, with map information, airport layouts or the like data 14 and provided for use by the pilot as an assemblage 16. The remote end 16A of the assemblage is unconnected to allow for page-turning while the other opposite end 16B is interconnected by ring binder means 18.

More particularly, the interconnecting means 18 is of a commercially available type consisting of plural rings 20 joined by a connecting rod 22 and, in use, the rings 20 are disposed in cooperating punch holes 24 and the rod 22 positioned beneath the assemblage 16, as best shown in FIG. 2.

Another component is comprised of a spring clip means 26, also of a commercially available type consisting of a springy metal body providing clamps 26A and 26B, of which clamp 26A is stationary in the use to which it is put herein, and clamp 26B undergoes opening and closing movements under the urgency of the springy construction material of the spring clip body.

Completing the construction of the article 10 is a support 28 having angled panels 28A, 28B presenting opposite ends 28C and 28D. As best shown in FIG. 3, the assemblage 16 is positioned on the inclined panel 28B and serving as a stop against descending movement are upturned flanges 30 at the support end 28D while side upturned flanges 32 form an open enclosure for the assemblage 16, and, in a preferred embodiment, the clamp 26A is soldered or otherwise appropriately attached, as at 34 to the support end 28C. Movable clamp 26B is normally in engaged relation under spring bias about the assemblage edge 16A preparatory to manual release allowing page-turning upon depressing the clamp 26B. The FIG. 3 elevated position of article 10 which contributes to the display positioning of the imprinted data 14 to the pilot user is provided in any appropriate manner, as exemplified by the screw, nut and sleeve attachment 36 to a clip 38 adapted to engage a suitable cockpit support (not shown).

In use, manual release of the spring clip means 26 contributes to manual page-turning, as denoted by the arrow 40, until encountering a selected flight chart 12 of interest while the attachment of the other flight charts is maintained by the ring binder means 18 to the support 28. Not only does ring binder-attachment avoid disarray of the assemblage 16, but the flight chart of interest is held under the clamp 26B at one end 16B in overlying relation upon the inclined support panel 28B and is, as a result, presented in a favorable display position to the pilot user.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A convenience article of manufacture for assisting an airplane pilot in navigation comprising an assemblage of flight charts useful to an airplane pilot imprinted on plural paper substrate pages of rectangular shape having first and second opposite edges, a support for said assemblage having first and second opposite edges, ring binder means operatively disposed to interconnect said first edges of said assemblage to a first edge of said support so as to allow a pivotal traverse of said assemblage pages in relation to said ring binder means, and spring clip means attached to said second edge of said support and releasably engaged to said second edges of said assemblage, whereby manual release of said spring clip means contributes to manual page-turning of said assemblage until encountering a selected flight chart of interest while maintaining said attachment of said other flight chart pages to said support.

2. The article of manufacture as claimed in claim 1 in which said support is angularly oriented in an operative position in facing relation to the pilot user.

3. The article of manufacture as claimed in claim 2 in which the angular orientation of the support locates one opposite edge in a clearance position above said other opposite edge, and said support lower edge is said first edge thereof to which said ring binder means is attached to contribute to facilitated page-turning of said assemblage in a downward directional traverse.

* * * * *